Nov. 14, 1967  C. M. ANDERSON  3,352,598
TRACTOR CAB MOUNTING APPARATUS
Filed Dec. 2, 1966  2 Sheets-Sheet 1
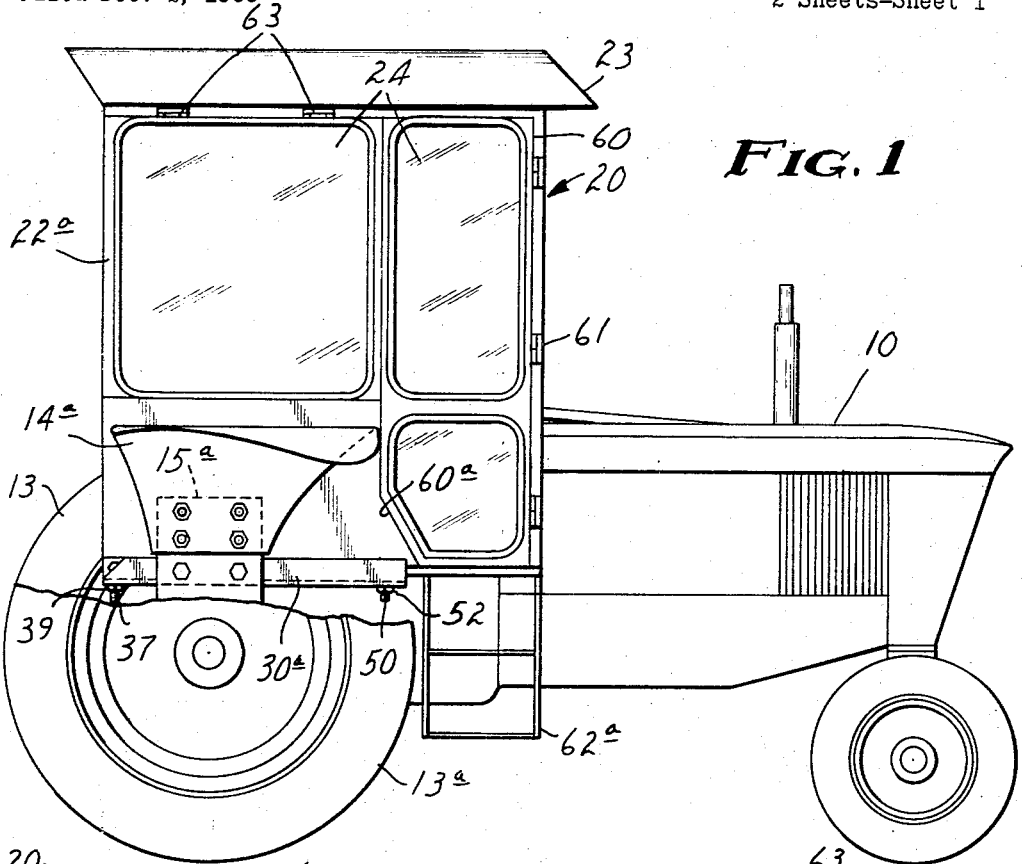
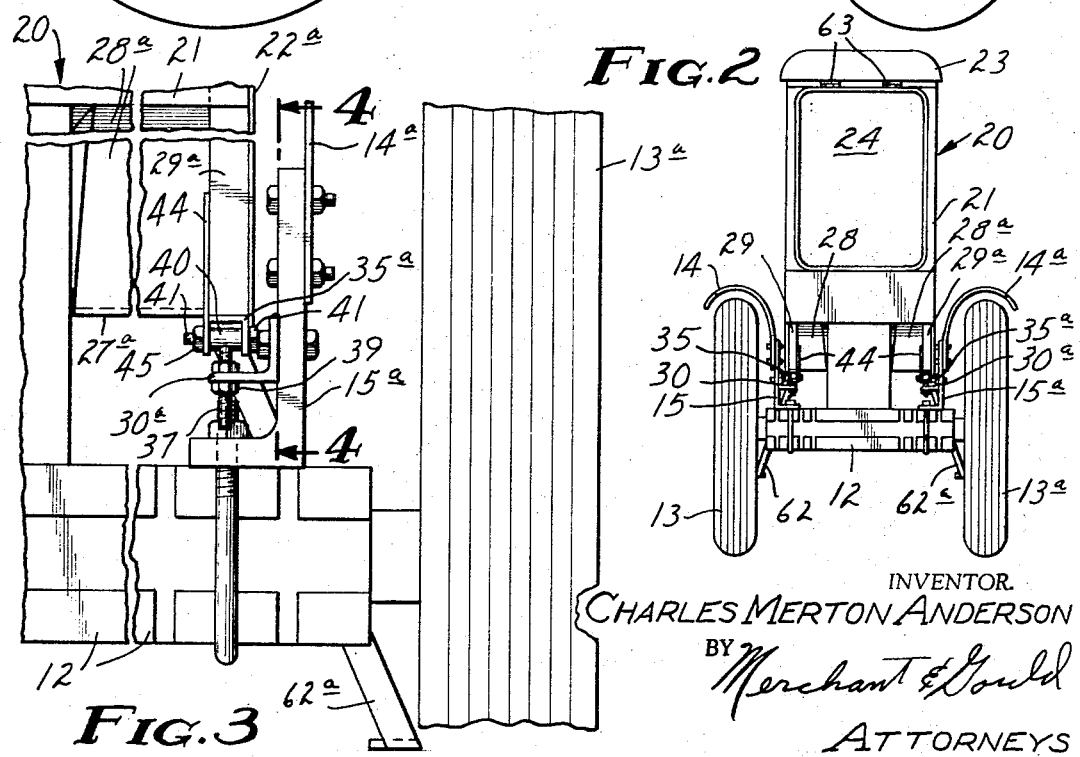
INVENTOR.
CHARLES MERTON ANDERSON
BY Merchant & Gould
ATTORNEYS Nov. 14, 1967  C. M. ANDERSON  3,352,598
TRACTOR CAB MOUNTING APPARATUS
Filed Dec. 2, 1966 2 Sheets-Sheet 2
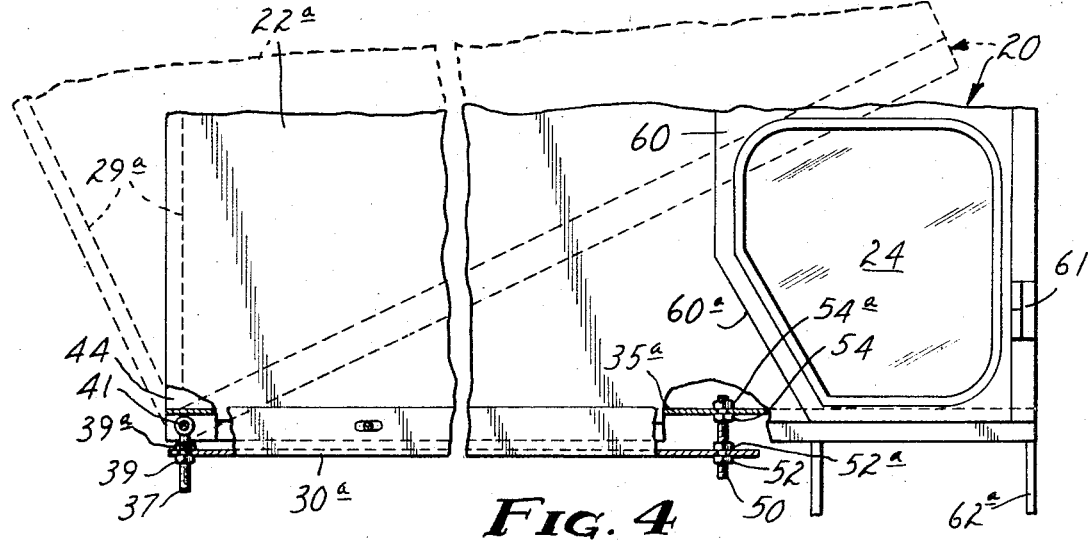
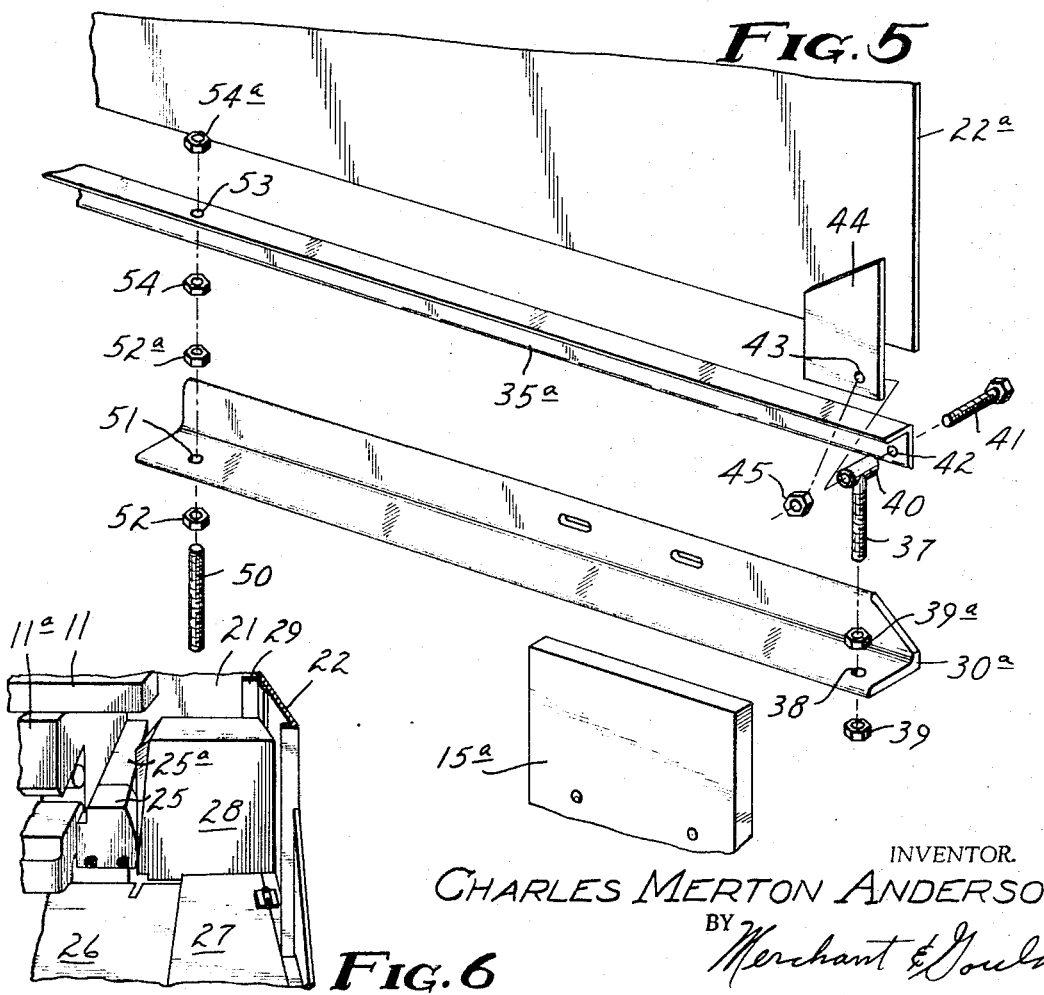
INVENTOR.
CHARLES MERTON ANDERSON
BY
Merchant & Gould
ATTORNEYS

United States Patent Office 3,352,598
Patented Nov. 14, 1967

3,352,598
TRACTOR CAB MOUNTING APPARATUS
Charles Merton Anderson, Rte. 2,
Mankato, Minn. 56001
Filed Dec. 2, 1966, Ser. No. 598,768
4 Claims. (Cl. 296—35)

ABSTRACT OF THE DISCLOSURE

This application discloses a tractor of the type wherein an operator position is located generally above the rear axle housing and between the rear wheels thereof, and an enclosed operator protecting cab for the tractor. The cab is mounted so that it can be pivotally swung upwardly and rearwardly with respect to the tractor to expose the operator position and is also mounted such that it can be raised or lowered and locked in a selected position with respect to the tractor.

---

A primary object of the present invention is to provide apparatus for mounting an enclosed cab on a tractor such that the cab can be pivotally swung upwardly and rearwardly with respect to the tractor, and can be raised or lowered and locked in a selected position with respect to the tractor.

This and other objects of the present invention will become apparent when considered in connection with the accompanying specification, claims, and drawings, wherein:

FIGURE 1 is a side elevational view of the cab mounted on a tractor according to the invention, portions thereof being broken away;

FIGURE 2 is a rear elevational view on a smaller scale of the apparatus of FIGURE 1;

FIGURE 3 is an enlarged view of the right side of FIGURE 2, portions thereof broken away;

FIGURE 4 is a sectional view taken along line 4—4 of FIGURE 3, parts thereof being broken away and parts being shown in section;

FIGURE 5 is an exploded perspective view of the apparatus for mounting the right side of the cab to the right fender support of the tractor; and FIGURE 6 is a perspective view, taken from the front, of the partial floor portion of the cab mounted in normal operating position beside the floor of the tractor, with the front wall portion of the cab being broken away.

Referring now to the drawings, there is disclosed a farm-type tractor 10 having an operator's seat 11 mounted at the operator's position located generally above the rear axle housing 12 of tractor 10 and between wheels 13 and 13a and rear fenders 14 and 14a thereof. Rear fenders 14 and 14a are bolted securely to fender support members 15 and 15a respectively. Fender support members 15 and 15a are in turn securely attached to rear axle housing 12. As shown in FIGURE 2, fender support members 15 and 15a can be moved to different positions along rear axle housing 12.

Rear fenders 14 and 14a can also be vertically adjusted by matching different sets of bolt holes in fenders 14–14a and fender support members 15–15a. Fenders 14 and 14a can thus be raised or lowered, or laterally adjusted with respect to the tractor, to accommodate different sized tires 13–13a or to provide space for the mounting of equipment on tractor 10.

An enclosed cab 20 is provided for tractor 10. Cab 20 includes a front wall portion (not shown), a rear wall portion 21, a left side wall 22, a right side wall 22a, and a top 23. Cab 20 has a generally rectangular horizontal cross-section so that the sides thereof are generally parallel. It should be noted at this time that cab 20 is constructed such that side walls 22 and 22a are welded to corner angle supports 29 and 29a. The front wall portion (not shown) and rear wall portion 21 are also welded to similar corner angle supports to rigidly support cab 20. As shown in the drawings, the walls of cab 20 are provided with a number of windows such as 24 to provide the operator with a complete view of the area supporting tractor 10.

Operator's seat 11 is mounted on a seat support member 11a, which in turn is securely mounted to axle housing 12. Also mounted on tractor 10 adjacent seat support member 11a are equipment housings 25 and 25a. Housings 25 and 25a are shown in FIGURE 6, it being understood that similar housings are located on the opposite side of seat support member 11a. Mounted in a horizontal plane in front of housing 25 is a centrally located tractor floor portion 26. Under normal operating conditions, the operator's feet will rest on floor portion 26.

Enclosed cab 20 also includes hinged bottom partial floor portions 27 and 27a that are adapted to abut the opposite sides of existing floor portion 26 of tractor 10 to increase the available surface area thereof. Partial floor portions 27 and 27a are hinged so that they can be swung from the positions shown to positions in parallel with side walls 22 and 22a respectively, so that they will clear the clutch and brake pedals of tractor 10 when cab 20 is rotated upwardly and rearwardly as shown in FIGURE 4.

Mounted between housings 25 and 25a, and side wall 22 is a raised floor portion 28 of cab 20. A similar raised floor portion 28a is located on the opposite side of tractor 10. Raised floor portions 28 and 28a act as housings for other power equipment (not shown) that might be mounted on rear axle housing 12 and also act to close off the remaining openings in the floor of cab 20.

Firmly bolted to the inside surfaces of fender support members 15–15a are a pair of longitudinally disposed angle members or frame members 30 and 30a. The bolt holes in angle members 30–30a that are used to connect them to fender support members 15–15a are slotted as shown in FIGURE 5 so that some forward and rearward adjustment of angle members 30–30a is possible.

Bolted or otherwise rigidly secured to the opposite bottom side edges of cab 20 are another pair of longitudinally disposed angle members or frame members 35 and 35a. With the cab 20 in a normal operator protecting position, as shown in FIGURE 1, angle member 35 is positioned directly above angle member 30, and angle member 35a is positioned directly above angle member 30a. The apparatus for attaching the angle members such that cab 20 can be pivotally swung upwardly and rearwardly as shown in FIGURE 4, and such that cab 20 can be raised or lowered with respect to tractor 10 such that floor portions 26, 27, and 27a will lie in the same horizontal plane, will be explained from the exploded view of FIGURE 5. FIGURE 5 discloses the mounting apparatus located on the right-hand side of the tractor. Since the mounting apparatus located on the left-hand side of the tractor is assembled in exactly the same fashion, a single explanation will suffice.

Referring now to FIGURE 5, the threaded anchor pin 37 extends vertically through an opening 38 formed in the rear end of the angle member 30a. A pair of nuts 39 and 39a are threadedly attached to anchor pin 37 so that anchor pin 37 extends upwardly a fixed selected distance above angle member 30a.

Attached to the upper end of anchor pin 37 in a sleeve member 40 having a bore therein lying at right angles to pin 37 and generally parallel to axle housing 12. Sleeve member 40 is attached to angle member 35a as follows. A bolt 41 extends horizontally through a hole 42 in the rear end of angle member 35a, the bore in sleeve member 40, and a hole 43 in a flat plate 44 that is welded or otherwise attached to the inner surface of angle member 35a and corner supports 29a to form a yoke for sleeve member 40. Threadedly attached to the end of bolt 41 is a nut 45. By this arrangement, angle member 35a can be swung upwardly and pivoted about an axis running through the bore in sleeve member 40. Cab 20, in the tilted or pivoted position, is shown in phantom in FIGURE 4.

Again, with respect to FIGURE 5, the apparatus for securing together the front ends of the associated angle members will be described. An anchor pin 50 extends vertically upwardly through a hole 51 in the front end of angle member 30a. A pair of nuts 52 and 52a are threadedly attached to pin 50 on opposite sides of angle member 30a so that pin 50 extends a selected distance above angle member 30a. With cab 20 located in the normal operator protecting position, pin 50 also extends upwardly through a hole 53 formed in the front end of angle member 35a. A second pair of nuts 54 and 54a are threadedly attached to pin 50 to lock angle member 35a a selected distance above angle member 30a.

Cab 20 is designed to be combined with several different models of tractors. Cab 20 is designed to operate not only with the different models sold by the same company, but with different models made by different companies. Since all of these different tractor models are built in a slightly different manner, some means must be provided to adjust the position of the cab with respect to the tractor. It is evident from FIGURE 1 that angle members 30 and 30a could be located or mounted in a higher set of mounting holes in fender support members 15 and 15a. These large adjustments in the vertical height of the cab are often not satisfactory, however. For example, the bottom set of holes in fender support members 15 and 15a might be too low while the next higher set of holes will be too high. In one case, floor portions 27 and 27a of cab 20 will lie below tractor floor portion 26 while in the other case they will lie above.

One of the main purposes of the present invention is to provide means to adjust the vertical position of cab 20 with respect to tractor 10 in small increments. Once the height of the cab is adjusted as closely as possible to its correct position by means of the holes in fender support members 15 and 15a, the final height adjustment can be made by utilizing the apparatus of my invention. The effective length of each anchor pin such as 37 and 50 can be changed by loosening the locking nuts and changing their position on the pins. Each of the four anchor pins can be adjusted separately to take care of any slight positioning problems that might arise.

If the cab 20 interferes with any repair work that is necessary on the tractor or its equipment, cab 20 can either be pivoted out of the way as shown in phantom in FIGURE 4 by removing nut 54a from pin 50 (and by removing the corresponding nut on the other side of the tractor), or cab 20 can be removed entirely by also removing nut 39 from pin 37 (the corresponding nut also being removed from the other side of the tractor). Only one or two wrenches is needed to raise or lower the cab, pivot it out of the way, or remove it completely from the tractor.

As an aid in pivoting cab 20, raised floor portions 28 and 28a have their inner and upper corners adjacent seat 11 beveled (as best shown in FIGURE 6) so that those corners do not interfere with seat 11 when cab 20 is pivoted upwardly and rearwardly with respect to tractor 10. Thus, cab 20 can be pivoted about pin 41 without the removal of seat 11.

Cab 20 is provided with a pair of side doors 60 that are attached by hinges 61 to the front corner angle supports of side walls 22 and 22a. The bottom rear corners of doors 60 are cut off as at 60a so that doors 60 will be certain to clear tires 13 and 13a.

To aid an operator in gaining entrance to cab 20 via doors 60, a set of steps 62 and 62a, are mounted on each of the angle members 35 and 35a beneath doors 60 and 60a. Steps 62 and 62a are mounted at an angle with respect to the vertical so that they extend both downwardly and outwardly from cab 20. This stairway type of step, as compared to a ladder that extends only downwardly from the cab, enables an operator to enter the cab without losing his balance and without using his hands to support his weight and balance.

Another important feature of my cab is the construction whereby the front and rear windows, and the two large side windows are connected to cab 20 by hinges 63 at their upper edges. The large windows can thus be swung outwardly about hinges 63 to provide ventilation for cab 20. In the summer, when only shade is required, all of the large windows and both doors can be removed entirely from cab 20.

It is evident from my disclosure that I have invented a new, unique, and unobvious combination of elements for the purpose of securely mounting a tractor cab to a tractor and thereafter adjusting its position on the tractor. Since those skilled in the art may be able to design equivalent apparatus to perform the same function, I intend not to be bound by the disclosure but only by the scope of the appended claims.

I claim as my invention:

1. Apparatus for mounting in a pivotably movable and vertically adjustable fashion, an enclosed operator protecting cab on a tractor of the type wherein an operator position is located generally above the rear axle housing of said tractor and between the rear wheels and rear fenders thereof, comprising:
   (a) a first pair of longitudinally disposed angle members rigidly secured to the opposite bottom side edges of said cab in a generally parallel relationship;
   (b) a second pair of longitudinally disposed horizontally positioned angle members rigidly secured to the inner surfaces of said fenders in a generally parallel relationship, said first pair of angle members being located directly above said second pair of angle members with said cab in a normal operator protecting position;
   (c) a front pair and a rear pair of threaded anchor pins extending vertically through openings in the front and rear ends of said second pair of members;
   (d) means threadedly attached to a lower portion of each of said anchor pins to lock said anchor pins in selected positions with respect to said second pair of angle members, each of said anchor pins thereby extending upwardly from said associated angle member of said second pair a selected distance;
   (e) a sleeve member securely attached to the upper end of each of said rear pair of anchor pins, said sleeve member having a bore therein lying at right angles to said anchor pin and generally parallel to the rear axle of said tractor;
   (f) mounting means including bolt means extending through openings in the rear ends of said first pair of angle members and through said bore of said sleeve for pivotally securing said cab to said tractor, said front pair of anchor pins extending upwardly through openings in said first pair of angle members; and
   (g) further means threadedly attached to an upper portion of said front pair of anchor pins to lock said first pair of angle members a selected distance above said second pair of angle members.

2. In combination with an enclosed cab having a front portion, a rear portion, a pair of generally parallel sides, a top, and bottom partial floor portions adapted to abut the existing floor portion of a tractor to increase the surface area thereof, a mechanism for mounting and leveling said cab on such a tractor comprising:
   (a) a pair of longitudinally disposed upper frame members rigidly secured to said sides of said cab adjacent said bottom portion;

(b) a pair of longitudinally disposed lower frame members adapted to be rigidly secured to a tractor on opposite sides of an operator's position on the tractor, said cab being located over the operator's position on the tractor with said pair of upper frame members lying above said pair of lower frame members;

(c) means for securing said pair of lower frame members to a tractor;

(d) a rear pair of anchor pins;

(e) means for adjustably connecting said rear pair of anchor pins to the rear ends of one of said pairs of frame members and for individually locking said rear pair of anchor pins in selected positions with respect to said one pair of frame members;

(f) means for pivotally connecting said rear pair of anchor pins to the rear ends of the other of said pairs of frame members to permit said cab to be pivotally swung upwardly and rearwardly about an axis located generally along the bottom edge of said rear portion of said cab to thereby expose said operator's position;

(g) a front pair of anchor pins; and (h) means for adjustably connecting said front pair of anchor pins to the front ends of adjacent upper and lower frame members and for individually locking said anchor pins in selected positions with respect to said frame members, said upper frame members being held a selected distance above said lower frame members by said anchor pins to place said bottom partial floor portions in the same plane as the existing floor portion of the tractor.

3. The apparatus of claim 2 wherein said bottom partial floor portions of said cab are hinged to the sides thereof so that said bottom partial floor portions can be swung to a position in parallel with said side walls to avoid interference with said tractor when said cab is pivotally moved.

4. An enclosed operator protecting cab for mounting on a tractor of the type wherein an operator's position is located generally above the rear axle housing of the tractor and between the rear wheels and rear fenders of the tractor, and wherein the tractor is provided with a partial floor portion, comprising:

(a) said enclosed cab having a front portion, a rear portion, a pair of generally parallel sides, a top, and bottom partial floor portions adapted to abut the existing floor portion of the tractor to increase the surface area thereof;

(b) a first pair of frame members rigidly secured to said sides of said cab adjacent said bottom portion;

(c) a second pair of frame members rigidly secured to the tractor on opposite sides of the operator's position, said cab being located over the operator's position on the tractor with said first pair of frame members positioned adjacent said second pair of frame members;

(d) a front pair and a rear pair of anchor means; and (e) means for connecting said front pair and said rear pair of anchor means to the front and rear ends respectively of adjacent first and second frame members and for individually locking said anchor means in selected positions with respect to said frame members, said first and second frame members being held a selected distance apart by said anchor means to place said bottom partial floor portion in the same plane as the existing floor portion of the tractor.

References Cited
UNITED STATES PATENTS

| | | | |
|---|---|---|---|
| 123,395 | 2/1872 | Greenslade | 280—7 |
| 792,520 | 2/1905 | Pearl | 180—89 |
| 2,362,453 | 11/1944 | Cosper | 180—54 |
| 2,565,919 | 8/1951 | Hill | 296—28 |
| 2,857,977 | 10/1958 | Bock | 180—89 |

BENJAMIN HERSH, *Primary Examiner.*

J. A. PEKAR, *Assistant Examiner.*